INVENTOR.
CLYDE H. O. BERG,
BY
AGENT.

June 25, 1957  C. H. O. BERG  2,796,947
SELECTIVE ADSORPTION PROCESS AND APPARATUS
Filed Oct. 1, 1954  3 Sheets-Sheet 2

INVENTOR.
CLYDE H. O. BERG,
BY
AGENT.

June 25, 1957 C. H. O. BERG 2,796,947
SELECTIVE ADSORPTION PROCESS AND APPARATUS
Filed Oct. 1, 1954 3 Sheets-Sheet 3

INVENTOR.
CLYDE H. O. BERG,

United States Patent Office 2,796,947
Patented June 25, 1957

2,796,947
SELECTIVE ADSORPTION PROCESS AND APPARATUS

Clyde H. O. Berg, Long Beach, Calif., assignor to Union Oil Company of California, Los Angeles, Calif., a corporation of California Application October 1, 1954, Serial No. 459,779

19 Claims. (Cl. 183—4.2)

This invention relates to an improved process and apparatus for the separation of gaseous mixtures by continuous selective adsorption on a moving bed of solid granular adsorbent and also relates in general to solids-fluid contacting processes wherein a granular solid contact material is recirculated through at least one fluid contacting zone. Such contacting processes are also exemplified by the many modern hydrocarbon conversion processes such as catalytic cracking, reforming, cyclization, desulfurization, hydrogenation, dehydrogenation, polymerization, isomerization, and other processes wherein a hydrocarbon fluid is passed into contact under conversion conditions of pressure, temperature, and composition with a recirculated body of conversion catalyst solids. More specifically this invention relates to an improvement in the process and apparatus for such solids-fluid contacting operations in which the mesh size of the solid particles making up the granular solid contact material is readily controlled so as to avoid the well-known disadvantages due to solids attrition, equipment erosion, the presence of solids fines in the circulating solids stream, etc. as indicated below.

There are numerous operations in which the movement of finely ground, crushed, powdered or other granular solids is required. Nearly any industrial operation or process in which the raw materials, reagents, intermediate products, final products, or by-products are solids requires facilities for transporting such solids from one place to another. This is true in metallurgical processes, clarification processes involving adsorption, catalytic processes, miscellaneous grinding, screening and classification processes, the manufacture of plastics, and many others. In nearly all of these, application of the conveyance method of the present invention may be employed to advantage.

Selective adsorption processes for the separation of gaseous mixtures and catalytic processes for the manufacture of synthetic fuels and synthetic organic chemicals may employ a continuously moving bed of granular adsorbent or catalyst which is recirculated through a vessel or vessels. In such a process the flowing solid may pass downwardly by gravity through a tower, column or other vessel to the bottom from which it is removed and conveyed to a reactivation or regeneration zone, or it may be recirculated to the top of the vessel from which it was removed. The conveyance of these solids is of the utmost importance to the process and it has been accomplished heretofore by means of elevators, screws, or other similar mechanical means. In such mechanical means for solids conveyance the chief disadvantage has been the high loss of solids circulated due to abrasion, grinding, and other mechanical attrition which tends to form fines and the difficulty of maintaining moving equipment at high pressures and temperatures. In the circulation of expensive catalysts and adsorbents, and the like, the method and apparatus for solids conveyance according to this invention achieves results which are highly desirable by markedly decreasing such attrition losses.

A minimal amount of such solids fines invariably is formed by attrition due to the fact that the solids are circulated in the system and steps must be taken to remove them and prevent the solids fines concentration from building up in the circulating solids stream and interfering with the flow of fluids being contacted. Similarly in the miscellaneous solids conveyance processes indicated above the formation of fines by attrition is preferably minimized and frequently the separation of such fines is required.

It is therefore a primary object of this invention to provide an improved solids-fluid contacting process in which an improved solids circulation system is employed to separate solids fines at high efficiency.

It is also a primary object of this invention to provide an improved process for the separation of gaseous mixtures by selective adsorption in which losses of granular adsorbent due to attrition are substantially reduced.

It is a further object of this invention to supplement the selective adsorption process with a method for conveyance of the circulated granular adsorbent with a minimum of fines formation thereby maintaining a low pressure drop for gases or vapors flowing through the granular solids bed.

Another object of this invention is to provide a method for the conveyance of substantially any type of granulated solids including adsorbents, catalysts such as those employed in continuous catalytic cracking operations in which a moving bed or suspension of catalyst is used, chemicals, agricultural products such as grains, industrial commodities such as sand, pulverized cement, finely divided minerals such as ores, and the like with a minimum of loss due to abrasion or attrition.

It is an additional object of this invention to provide for the increased ease of handling of granular, pulverized, or other finely divided solids materials as hereinafter more fully described.

Another object of this invention is to provide for increasing the operational efficiency of continuous processes employing the circulation of moving beds of solid granular materials through treating systems by decreasing solids losses due to attrition and abrasion, and to substantially increase the efficiency of solids fines removal from such recirculated solids.

Another object of this invention is to provide an improved apparatus for the separation of gaseous mixtures by continuous selective adsorption.

It is another object of this invention to provide an improved means for conveyance of granular solids substantially without fines formation due to attrition.

Other objects and advantages of this invention will become apparent to those skilled in the art as the description thereof proceeds.

This application is a continuation-in-part of my copending application Serial No. 47,966 filed September 7, 1948, now Patent No. 2,694,605, issued November 16, 1954.

Briefly, the present invention is exemplified by an improved selective adsorption process in which a moving bed of solid granular adsorbent is passed continuously downwardly by gravity through an adsorption system to contact the gaseous mixture to be separated in an adsorption zone. In this adsorption zone the more readily adsorbable constituents are adsorbed forming a rich adsorbent leaving a lean gas product containing the less readily adsorbed constituents. The rich adsorbent is passed into a desorption zone where it is indirectly heated and contacted with a stripping gas such as steam to effect desorption of the more readily adsorbable constituents forming a rich gas product and leaving a lean adsorbent. The lean gas product is removed from the adsorption zone and the rich gas product is removed from the desorption zone, each being substantially uncontaminated by constituents desired in the other. The lean adsorbent is removed from the lower portion of the decorption zone, suspended in a lift gas in an induction zone to form an adsorbent-lift gas suspension, and passed through a conduit to an impactless separator zone containing an extension of the conveyance zone which is herein termed an extension zone and a settling zone comprising the remainder of the separator zone. The extension zone preferably comprises at least one tubular member having substantially the same diameter as the lift line conduit. The suspended granular adsorbent is herein separated from the lift gas and the thus separated adsorbent is returned to the adsorption system substantially without loss by attrition. The lift gas may, if desired, be reemployed in the conveyance of further quantities of lean adsorbent by continuously recirculating the lift gas removed from the separation zone to the lower portion of the conduit where further quantities of adsorbent are suspended therein.

The improvement in the selective adsorption process, and also in any other process in general wherein moving beds of finely divided materials are employed and conveyed or circulated, arises from an exceedingly low rate of attrition when the solids being handled are transported according to the conveyance method and apparatus of the present invention. A substantial portion of the attrition rate reduction is due to the manner in which the solids are separated from the lift gas in the separation zone mentioned above. As the lift gas suspension moves through the conveyance zone or conduit into the impactless separation zone it enters the extension zone in which the lift gas velocity is gradually decreased from above the settling velocity to below it permitting the moving solids to dissipate momentum energy gradually against the force of gravity. The arresting of particle momentum may be effected in time intervals from as low as about 0.1 second or less to as high as 5 or 10 seconds or more depending upon the size and velocity of the particle. The lowering of lift gas pressure and velocity is effected over time intervals ranging from as low as 0.01 second to as high as 3 to 5 seconds or more. When this energy is dissipated the particles move radially out of the extension zone through apertures into the settling zone wherein the separated solids and the lift gas exist as substantially separate and independent phases. The decrease in lift gas velocity is effected by permitting the lift gas to flow laterally from the extension zone into the settling zone thus removing its motivating effect along the lift line axis on the solid particles being conveyed.

The lift gas velocity is not decreased rapidly as in the case where the gaseous suspension of solid materials is discharged coaxially from a lift line into a larger volume. The low energy particles which have been substantially separated from the lift gas are not permitted to interfere with the high energy particles which are at the time still acted upon by the motive forces of the lift gas. The lift gas velocity is decreased gradually permitting the high energy particles to lose momentum against gravity and move laterally away from the space into which the high energy particles are introduced. In effecting this, the abrasion resulting from the intimate contact of low energy and high energy particles is substantially eliminated and a simple, smooth, and efficient reversal of particle direction and the separation of suspended particles from the lift gas is effected.

The subsequent handling of the thus conveyed solids and the conveyance gas containing suspended solids fines is more clearly disclosed hereinafter by way of the following description of a selective adsorption process in which the novel solids conveying and elutriation steps are incorporated.

The process of selective adsorption is based upon the preferential adsorption phenomena exhibited by certain granular solid adsorbents in which some constituents of a gaseous mixture are adsorbed more strongly than other constituents. In general, those constituents having the higher molecular weights, the higher boiling points, or the higher critical temperatures are adsorbed more strongly. Distinct advantages are noted in the selective adsorption process over the conventional adsorption, extraction, and distillation processes in separating certain gaseous mixtures. Compared to the extreme temperature and pressure conditions sometimes necessary in conventional processes, gaseous mixtures may be separated by the selective adsorption process at substantially atmospheric temperatures and pressures, with moderate pressures such as between about 10 and about several hundred pounds per square inch absolute and moderate temperatures as from between 80° F. and 500° F. being usual.

Details of the method and apparatus involved in the improved selective adsorption process are most readily presented in conjunction with the accompanying drawings in which:

Figure 1 presents a combination vertical cross-sectional elevation view of a selective adsorption column in which the improved separation and solids handling process is carried out;

The term "stalling velocity" used in the following description is defined as the minimum lineal velocity of lift gas in the lift line at which the gas-solid suspension may be transported without settling. It is also the velocity at which the lift line differential pressure is at a minimum.

The term "lift line velocity," and "lifting velocity" are defined as the lineal lift gas velocity in an operating lift line.

The term "settling velocity" is defined as the rate at which a particle falls by gravity through a medium comprising still lift gas. For 12 to 30 mesh charcoal in air, the settling velocity is about 10 feet per second and varies with other solids and gases depending upon the densities of the solid and the gas and upon the viscosity of the gas.

It should be understood that although the combination of the pneumatic conveyance method of this invention with the adsorption process is of unusual merit, as will be apparent from the following description, this description is not intended to limit the the use of the conveyance method and apparatus of this invention to use with the particular adsorption process described since the conveyance described hereinafter may be applied to other adsorption processes in which three, four or more fractions are produced, as well as to many processes and apparatus in which powdered, granulated, or other divided solids are handled.

Figure 1:
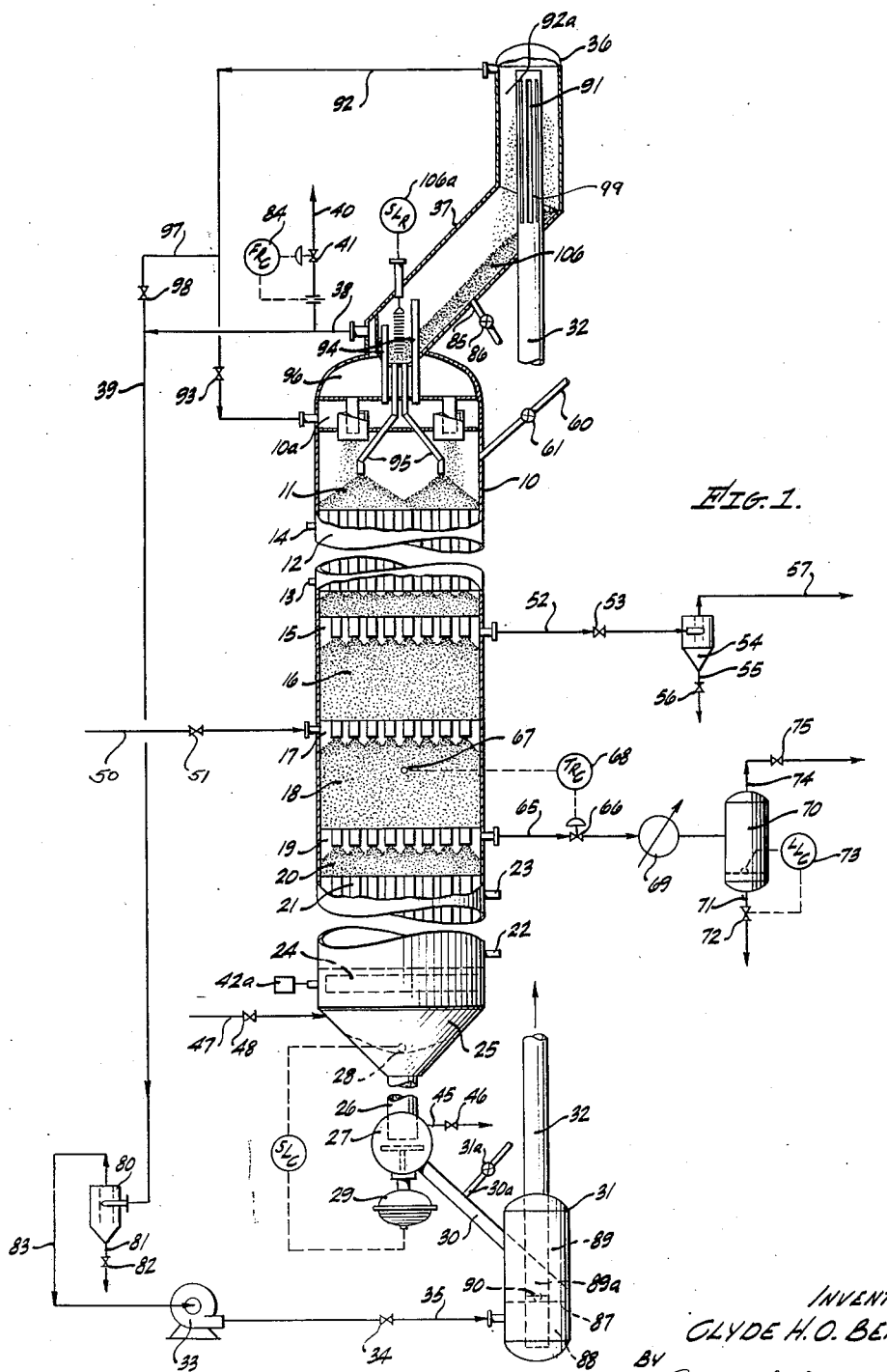

Referring now more particularly to Figure 1, a brief description of one modification of the selective adsorption process follows.

Selective adsorption column 10 is provided at successively lower levels with centrifugal separator zone 10a, adsorbent hopper or storage zone 11, adsorbent cooling zone 12 provided with inlet 13 and outlet 14, lean gas disengaging zone 15, adsorption zone 16, feed gas engaging zone 17, rectification zone 18, rich gas disengaging zone 19, steaming zone 20, heating zone 21 provided with inlet 22 and outlet 23, adsorbent flow control zone 24, and bottom zone 25. Flow control zone 24 comprises a mechanical feeder in which a movable plate is given a reciprocating motion by motive means 42a.

This mechanical feeder is more clearly described and claimed in my application, Serial No. 618,347, filed September 24, 1945, now U. S. Patent No. 2,544,214.

The solid granular adsorbent passes downwardly by gravity as a dense phase in a moving bed successively through the aforementioned zones from adsorbent hopper 11 to flow control zone 24 and collects in bottom zone 25. The adsorbent is removed from bottom zone 25 through sealing leg 26 and is passed through adsorbent flow control valve 27. Valve 27 serves to maintain bottom zone 25 partly full of adsorbent and is actuated by level control means 28 operating through pneumatic or electrical controller 29 causing valve 27 to open or close. The adsorbent passing through valve 27 passes downwardly by gravity through transfer line 30 and is introduced into induction zone 31.

This induction zone serves to form an adsorbent-lift gas suspension which is subsequently conveyed through conduit 32 as a lift line to impactless separator 36 where the suspended adsorbent granules are separated substantially without attrition and introduced into the upper portion of selective adsorption column 10.

The operation and control details of induction zone 31 and a multitube lift line are more clearly described and claimed in my copending application Serial No. 18,913 filed April 5, 1948, now abandoned and Serial No. 340,795 filed March 6, 1953.

Figure 2:
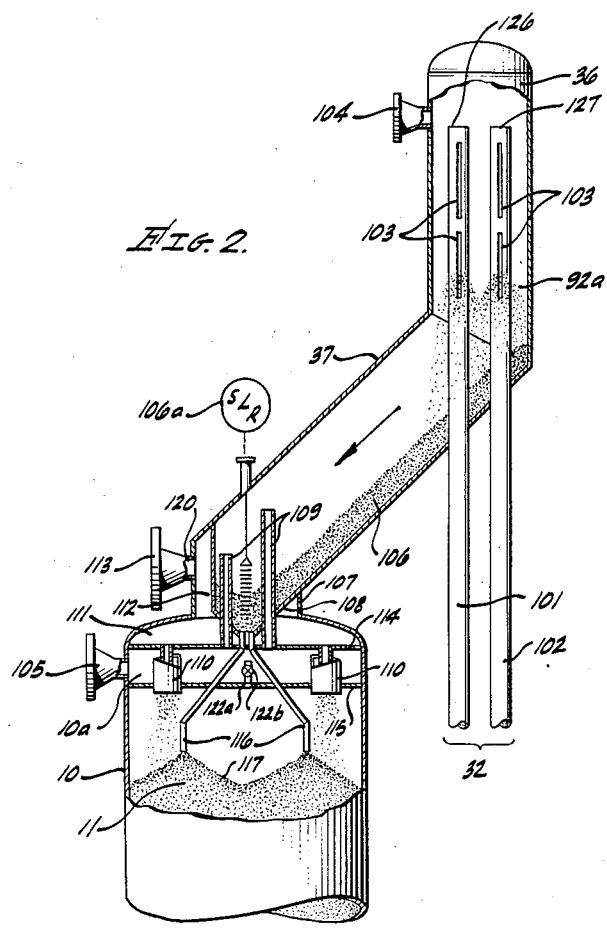
Figure 2 is an elevation view of a cross section of the separation zone and the elutriation zone in which solid particles are separated with greater efficiency from lift gas suspensions.

Briefly, however, induction zone 31 is provided with a transverse division in the form of lateral plate 87 forming lift gas inlet zone 88 and an adsorbent inlet zone 89, below and above, respectively. Lift line 32, which may comprise a multiplicity of parallel tubes of circular or other shaped cross section, extends through adsorbent inlet zone 89, transverse plate 87, and into lift gas inlet zone 88. That portion of lift line 32 extending through the adsorbent inlet zone comprises suspension zone 89a in which a lift gas-adsorbent suspension is formed from adsorbent granules entering from adsorbent inlet zone via perforations 90. Perforations 90 may comprise bored or punched holes, slots, a screened section or the like to permit passage of the granules into suspension zont 89a. The lift gas is introduced by means of lift gas blower 33 controlled by valve 34 through line 35 into lift gas inlet zone 88 and into the open end of the tubes present therein to suspension zone 89a wherein the suspension is formed. The lift gas suspension passes upwardly at a velocity above the settling velocity through lift line 32 which comprises any form of hollow conduit, and enters lift line extension 99 in separator 36. In Figure 1 lift line 32 is shown as a single hollow tube of circular cross section arranged coaxially with induction zone 31 and lift line or conduit extension 99 in impactless separator zone 36. However, in installations where larger quantities of granular adsorbent must be handled, a multiplicity of parallel tubes may be employed as indicated in Figure 2.

That portion of lift line 32 extending into impactless separator 36 comprises extension or depressuring zone 99 and is provided with perforations 91 which in Figure 1 are indicated as being a series of longitudinal slots. In this manner the pressure and the velocity of the lift gas are gradually decreased by allowing the gas to disengage itself from extension zone 99 through the perforations 91 into the annular volume of settling zone 92a in impactless separator 36. As the gas velocity decreases to below the settling velocity, gravitational forces act strongly upon the moving adsorbent particles causing them to lose energy of momentum. The solids are transported through perforations 91 to settle in settling zone 92a by the lateral flow of lift gas therethrough. The direction of the particle motion in settling zone 92a is 180° opposed to the direction within lift line 32. Attrition is hereby minimized by causing the separated particles to pass through settling zone 92a outside the tube or tubes of extension zone 99 in the opposite direction to the direction of flow inside the extension zone to prevent interparticle impact.

If desired, the entire quantity of lift gas together with the separated adsorbent particles as substantially independent phases may be removed from annular space 92a in impactless separator 36 at a point below extension zone 99 through transfer line 37. If desired, any portion of this lift gas may be by-passed via line 92 controlled by valve 93 into centrifugal separator zone 10a to decrease the gas velocity through transfer line 37. If desired, all or any part of the lift gas may be recirculated directly from separator 36 via line 92 and lift gas return line 39 through by-pass 97 controlled by valve 98. In this way, the elutriation of the circulating adsorbent may be carried out in separator 36.

In the upper portion of selective adsorption column 10, at the junction of the column proper and transfer line 37, is positioned a mechanism by means of which the lift gas and granular adsorbent may be separated and the adsorbent introduced into the column. This mechanism is provided with lift gas downcomer tubes 94 and adsorbent distribution tubes 95. Downcomer tubes 94 connect directly with centrifugal separator zone 10a while adsorbent distribution tubes 95 pass indirectly therethrough into adsorbent storage zone 11. Centrifugal separator zone 10a comprises upper and lower transverse plates or trays filling the entire cross section of selective adsorption column 10 and are provided with a series of centrifugal separators such as cyclones which are well-known to those skilled in the art. These separators are provided with a solids outlet opening into adsorbent storage zone 11 and a lift gas outlet opening into gas header 96. The lift gas passes from gas header 96 via line 38. A portion of this gas may be returned via lift gas return line 39 to form further quantities of lift gas-adsorbent suspension, and a portion is continuously removed via line 40 controlled by valve 41 at a predetermined rate controlled by flow recorder controller 84.

As clearly indicated in Figure 1, the settled adsorbent moves downwardly through transfer line 37 as a moving bed 106 and forms an accumulation of solids which submerges the upper inlet openings of distribution tubes 95. The level of solids accumulation is variable and is indicated and recorded by solids level recorder 106a. The distribution tubes 95 are thus kept full of downwardly moving masses of dense solid particles. Due to the high resistance to gas flow through such dense solids, the lift gas is prevented from concurrent flow therethrough and is substantially entirely forced from the lower part of transfer line 37 through lift gas downcomers 94 into centrifugal separator zone 10a for elutriation as described below. The solids level above distribution tubes 95 is maintained by the introduction of additional solids to the recirculating solids stream as subsequently described. The concurrent lift gas flow through the distribution tubes thus prevented otherwise seriously interferes with continuous removal of only solids fines from the recirculating solids in this invention.

The centrifugal separators positioned in zone 10a serve to recover suspended particles of adsorbent from the lift gas which are of a desirable size for further use in the circulating adsorbent stream while leaving those adsorbent particles which are considered undesirable in the circulating adsorbent stream suspended in the elutriation gas. Generally particles which are smaller than about 60 mesh are kept in suspension while those larger than 60 mesh are separated from the gas stream by the centrifugal separators in centrifugal separator zone 10a. The elutriation gas containing these suspended fines subsequently passes via line 39 into centrifugal separator 80 in which a substantially complete separation of fines is effected. Separated fines, smaller than about 60 mesh, are removed therefrom by means of line 81 controlled by valve 82 and the solids free lift gas is passed by means of line 83 into lift gas blower 33. Removal of adsorbent fines in this manner completely eliminates problems arising from erosion of the lift gas blower rotor. The maximum average particle size of the adsorbent fines thus removed from the adsorbent circulated through adsorption column 10 is determined by the controlled velocity at which the lift gas passes through centrifugal separator zone 10a and the mechanical design of the separators therein.

Line 38 carrying the lift gas removed from centrifugal separator zone 10a also carries the purge gas which passes upwardly through cooling zone 12, adsorbent storage zone 11, into zone 10a. The purge gas flow rate is controlled by flow recorder controller 84 which actuates valve 41 in line 40. The gas thus continuously removed may be returned with the feed gas, produced as a product gas, sent to fuel, flared, or otherwise disposed of in a manner not shown. The removal may, if desired, be made intermittently, but continuous removal is preferred.

Line 85 controlled by valve 86 is provided to pass the adsorbent from column 10 into a storage bin or through a reactivation vessel. A small portion of the circulating adsorbent, between about 1% and 25% by weight, is subjected to a continuous high temperature steam reactivation treatment to remove higher molecular weight materials which may be present in the adsorbent.

A portion of the lift gas introduced into induction zone 31 passes upwardly through transfer line 30 countercurrent to the downwardly flowing adsorbent. This gas is removed from flow control valve 27 by means of line 45 controlled by valve 46 to prevent the upflow of lift gas into the lower part of the selective adsorption column. Simultaneously, a portion of the stripping gas introduced into bottom zone 25 by means of line 47 controlled by valve 48 flows downwardly through sealing leg 26 concurrently with the adsorbent and this portion of stripping gas is also removed by means of line 45 controlled by valve 46 as a seal gas which effectively isolates the lower portion of the selective adsorption column from the induction zone of the lift gas system.

The apparatus described in Figure 1 is readily applicable to the production of ethylene, for example, from a mixture of cracked gases obtained from the pyrolysis of the normally liquid or gaseous petroleum fractions. Operating conditions for recovering ethylene by selective adsorption from a cracked gas product are given below as a practical example:

EXAMPLE I

The selective adsorption column was employed to recover the ethylene present in a demethanizer overhead gas which had the following composition:

*Table 1.—Demethanizer overhead gas or adsorption column feed gas analysis*

| Ingredient: | Mol percent |
|---|---|
| Hydrogen | 39.8 |
| Nitrogen | 1.7 |
| Carbon monoxide | 0.9 |
| Oxygen | 0.1 |
| Methane | 51.3 |
| Carbon dioxide | 0.2 |
| Acetylene | 0.2 |
| Ethylene | 5.8 |
| Ethane | Trace |
| Total | 100.0 |

The selective adsorption process and apparatus developed to separate the ethylene from this feed gas employed 15,000 pounds of activated charcoal as the adsorbent which was circulated through the column at a rate of 18,000 pounds per hour. The selective adsorption column was self-supporting, 4.5 feet in diameter and 85 feet in height. A charcoal storage vessel 4.0 feet in diameter and 60 feet high was provided to hold make-up charcoal to be added as required to maintain a level in the top of the column and also to hold charcoal removed from the column during inspection.

The feed gas stream having the composition shown in Table 1 flowed at a rate of 73,900 s. c. f. (standard cubic feet) per hour and was available at 120 pounds per square inch gauge pressure and a temperature of $-130°$ F.

The gas was depressured to 75 pounds per square inch gauge pressure and interchanged to atmospheric temperature to recover refrigeration. This gas was introduced through line 50 controlled by valve 51 into feed gas engaging zone 17. The gas thus introduced passes upwardly through adsorption zone 16 countercurrent to the downwardly flowing lean charcoal at a temperature of 120° F. The ethylene content of the feed gas is thus adsorbed along with a small proportion of carbon dioxide and methane which are less readily adsorbable. The charcoal temperature was raised to 150° F. by the ethylene adsorption. The major proportion of the methane and substantially all of the less readily adsorbable constituents remain as an unadsorbed lean gas.

The lean gas passes upwardly and enters lean gas disengaging zone 15. A portion of this lean gs is removed from lean gas disengaging zone 15 at 120° F. by means of line 52 controlled by valve 53 and is introduced into separator 54 wherein suspended charcoal fines are removed. The separated fines pass through line 55 controlled by valve 56 out of separator 54. The lean gas is removed from separator 54 at a rate of 44,825 s. c. f. per hour by means of line 57. The composition of the lean gas is as follows:

*Table 2.—Lean gas analysis*

| Ingredient: | Mol percent |
|---|---|
| Hydrogen | 31.6 |
| Nitrogen | 1.4 |
| Carbon monoxide | 0.8 |
| Oxygen | 0.1 |
| Methane | 66.1 |
| Carbon dioxide | ---- |
| Acetylene | ---- |
| Ethylene | ---- |
| Ethane | ---- |
| Total | 100.0 |

The dew point of the lean gas product is very low, less than $-100°$ F., made possible by the desiccating action of the adsorbent.

The remaining portion of the unadsorbed gases, which is not removed with the lean gas, comprises a purge gas which passes upwardly through the tubes of adsorbent cooling zone 12 countercurrent to the downwardly flowing charcoal and into elutriation zone 10a. This gas serves to saturate the lean cool charcoal with the constituents of the lean gas product and also to dehydrate the lean charcoal. During the passage of this purge gas through cooling zone 12 a partial enrichment of the purge gas in the less readily adsorbable constituents occurs so that the purge gas passing into elutriation zone 10a from hopper 11 and leaving the upper portion of selective adsorption column 10 has the following composition:

*Table 3.—Purge gas analysis*

| Ingredient: | Mol percent |
|---|---|
| Hydrogen | 61.8 |
| Nitrogen | 2.5 |
| Carbon monoxide | 1.3 |
| Oxygen | 0.2 |
| Methane | 33.7 |
| Carbon dioxide | 1.0 |
| Acetylene | ---- |
| Ethylene | 0.4 |
| Ethane | ---- |
| Total | 100.0 |

This gas may be produced as a third fraction, if desired, through lines 38 and 40 controlled by valve 41.

The volumetric rate of flow of the purge gas is 24,600 s. c. f. per hour. Comparison of the composition of the purge gas shown in Table 3 with the composition of the lean gas shown in Table 2 indicates that a substantial proportion of the methane present in the lean gas is adsorbed by the charcoal from the purge gas and that the hydrogen concentration nearly doubles. The composition of the purge gas shown in Table 3 is substantially the same as the composition of the lift gas employed for transporting charcoal removed from the bottom of selective adsorption column 10 to the top of the column. The lift gas is recirculated through the system at a rate of 271,000 s. c. f. per hour. The quantity of gas removed through line 40 controlled by valve 41 and flow recorder controller 84 is about 25,000 s. c. f. per hour.

The quantity of charcoal in the system at any given time is indicated by solids level recorder 106a described above. It is desirable to maintain a constant level of charcoal above the inlets to distribution conduits 95 as described and additional quantities of charcoal are introduced by means of line 60 controlled by valve 61 from a storage bin, not shown but previously described, to maintain such a level of the charcoal at the desired position. The total quantity of charcoal in the system is thus maintained at about 15,000 pounds.

A reactivator, not shown, is provided through which about 5% by weight of the charcoal flow is by-passed. The adsorbent is subjected to a high temperature steam treatment to maintain the adsorptivity of the charcoal. This charcoal is removed from transfer line 37 through line 85 controlled by valve 86 and passes through the reactivator. The treated charcoal is introduced by means of line 30a controlled by valve 31a into transfer line 30.

The rich charcoal formed in adsorption zone 16 containing adsorbed ethylene and small quantities of the less readily adsorbable constituents passes downwardly through feed gas engaging zone 17 and is introduced into rectification zone 18 wherein it is countercurrently contacted with a rich gas reflux consisting of substantially pure ethylene. This reflux serves to substantially completely desorb adsorbed quantities of methane from the rich charcoal leaving a rectified charcoal containing adsorbed reflux ethylene which raised the temperature to 210° F.

The rectified charcoal thus formed passes downwardly through rich gas disengaging zone 19 into steaming zone 20 wherein it is heated to 365° F. by steam adsorption. The major portion of the adsorbed ethylene is preferentially desorbed in steaming zone 20 and the charcoal passes into heating zone 21. In heating zone 21 the charcoal is indirectly heated by means of flue gas or condensing vapors, such as steam or mixtures of diphenyl and diphenyl oxide, whereby the charcoal is heated to a temperature of about 510° F. Stripping steam is introduced at a rate of about 375 pounds per hour into bottom zone 25 by means of line 47 controlled by valve 48. A small portion of this steam passes downwardly and is removed as a seal gas through line 45, as previously described, while the major proportion passes upwardly through the tubes of heating zone 21 countercurrent to the downwardly flowing hot charcoal. By the combination of stripping steam and indirect heating, a substantially complete desorption of the remaining adsorbed ethylene is effected and the gas thus desorbed passes upwardly into rich gas disengaging zone 19. The charcoal carrying the adsorbed steam passes down through the tubes to hotter areas where the steam is desorbed. This stripping gas recycle amounts to about 1200 pounds per hour so that the total effective stripping gas rate is about 1575 pounds per hour.

A portion of the thus desorbed ethylene passes upwardly through rich gas disengaging zone 19 into rectification zone 18 wherein it serves as the rich gas reflux mentioned above. The remaining portion of rich gas is removed from rich gas disengaging zone 19 by means of line 65 controlled by automatic control valve 66. Control valve 66 is actuated by thermocouple 67 and temperature recorder controller 68. The presence of the rich gas reflux in rectification zone 18 exerts a temperature effect in conjunction with the preferential desorption of less readily adsorbable constituents from the rich charcoal by the rich gas reflux. The charcoal in equilibrium with the feed gas above thermocouple point 67 is at a temperature lower than that of the rectified charcoal in equilibrium with the rich gas reflux in rectification zone 18. The rich gas product passes through control valve 66 at a controlled rate and is introduced into rich gas cooler 69 wherein at least a portion of the stripping gas removed from rich gas disengaging zone 19 is condensed. The cooled rich gas product and the condensed stripping gas are introduced together into vapor liquid separator 70. The condensed stripping steam collects in the lower portion of separator 70 and is removed therefrom by means of line 71 controlled by valve 72 which in turn is actuated by liquid level controller 73. The condensate thus removed may, if desired, be returned to an evaporator and reintroduced as a stripping gas by means of line 47. The rich gas product is removed from separator 70 by means of line 74 controlled by valve 75 at a rate of 4475 s. c. f. per hour. This ethylene stream is passed through activated aluminum oxide driers to remove remaining traces of moisture and may be combined with the ethylene product from the ethylene tower of the low temperature fractionation equipment if desired.

The composition of the rich gas product thus produced is given as follows:

*Table 4.—Rich gas product analysis*

| Ingredient: | Mol percent |
|---|---|
| Hydrogen | ---- |
| Nitrogen | ---- |
| Carbon monoxide | ---- |
| Oxygen | 0.1 |
| Methane | ---- |
| Carbon dioxide | 2.9 |
| Acetylene | 3.6 |
| Ethylene | 92.7 |
| Ethane | 0.7 |
| Total | 100.0 |

The lean stripped charcoal formed in heating zone 21 is conveyed through lift line 32, passed through elutriation zone 10a, and is reintroduced into hopper 11 at a temperature of about 420° F. to be reused in the process.

The selective adsorption process above described effects nearly a 100% recovery of ethylene present in the feed gas and produces it as a rich gas product of nearly 93% purity, the remaining 7% being mostly $C_2$ hydrocarbon. The recirculating solids stream is kept substantially completely free of solids fines smaller than 60 mesh and no solids in the desired mesh size range larger than 60 mesh are carried out of the system in the recirculating lift gas stream because no lift gas is permitted to by-pass the centrifugal separators in zone 10a by passing downwardly through conduits 95 and then upwardly with purge gas through these separators.

The success of selective adsorption process in circulating substantial quantities of a granular solid adsorbent at high rates while at the same time maintaining an extremely low attrition or abrasion loss is due to the method for conveying the granular adsorbent from the bottom to the top of the column in the form of a gaseous suspension. The method briefly described above for recovering the suspended adsorbent in an impactless separator zone further contributes materially to the ability of the selective adsorption process to employ a moving bed of granular adsorbent with a very minor attrition of the circulated solids.

The preferred adsorbent in the selective adsorption process comprises activated nut, hull, or fruit pit charcoal, although other charcoals and such adsorbents as activated aluminum, iron, magnesium, chromium, and other metal oxides as well as silica gel and the like may also be used.

A detailed view of a vertical cross section of the upper portion of selective adsorption column 10 is shown in Figure 2. Parts of the apparatus shown in Figure 2 which are also shown in Figure 1 are indicated in Figure 2 with the same numbers.

Referring now more particularly to Figure 2, the lift gas suspension of solid granular adsorbent is conveyed by means of lift line 32, which in this modification comprises tubes 101 and 102 having extensions 126 and 127 open at the upper ends and having substantially the same diameter, into impactless separator 36. Settling section 92a thus formed comprises the remaining volume of the separator. Extensions 126 and 127 of tubes 101 and 102 in separator 36 are provided with a series of perforations which may be lateral, longitudinal, or helical slots, punched holes or other apertures which permit the lift gas to flow radially from its flow direction through extensions 126 and 127. In the modifications shown in Figure 2 these apertures comprise a series of three longitudinal slots, each 0.5 inch wide, in 3-inch nominal diameter tubes and through which a portion of the lift gas passes during passage of the suspension through the upper part of the lift lines. The lift gas velocity in the tubes, therefore, gradually decreases allowing the momentum of the particles being conveyed to dissipate against forces of gravity and friction against the lift gas. This radial flow of lift gas also causes the suspended particles to move laterally through the slots and enter annular settling zone 92a. The flow direction inside the lift line is upward while outside the extensions 126 and 127 it is downward. Thus the rising particles are prohibited from contacting the falling particles of adsorbent. When helical or lateral slots are employed, helical baffles may be used inside and/or outside of tubes 101 and 102 to lower the separated adsorbent gradually to transfer line 37.

The ratio of total slot width to tube periphery is between about 1 to 10 and 1 to 2, and preferably about 1 to 6, although ratios from as low as 1 to 25 may be used. In other words, the total width of the openings around the periphery of the extensions is between about 10% and about 50% and preferably about 16.7% of the periphery, although widths from as low as about 4% of the extension periphery may be used. By varying the slot width to periphery ratio, the rate at which the lift gas velocity is decreased in the perforated extension of the lift line may be controlled. The proper value of this ratio depends upon the type of solids being conveyed and the lift gas velocity.

As above described, all or a portion of the lift gas may be withdrawn from impactless separator 36 by means of coupling 104 and the gas thus removed is passed by means of a line not shown into centrifugal separator zone 10a via coupling 105. The adsorbent particles descend through settling zone 92a and separate from the lift gas outside extensions 126 and 127 to form a moving bed 106 passing downwardly along the lower surface of transfer line 37. A series of baffles, not shown, may be positioned from the lower surface of transfer line 37 to impede the downwardly flow of separated granules. The general construction of transfer line 37 employs an angle of about 45° with respect to the vertical axis of selective adsorption column 10. The velocity of the granules flowing through transfer line 37 is therefore kept low to minimize attrition loss.

The lower portion of transfer line 37 connects by means of collar 107 at a 45° axial angle and connects directly into the upper portion of selective adsorption column 10. The moving bed of granular adsorbent discharges into conical section 108 through which extends a series of lift gas downcomer tubes 109. These tubes carry the lift gas from transfer line 37, independently of the adsorbent phase, directly into elutriation zone 10a which is included between transverse plates 114 and 115. This gas, together with that portion of lift gas introduced directly from the upper portion of impactless separator 36 via line 92 shown in Figure 1, passes through centrifugal separators 110 to effect the separation of desirable size adsorbent granules which remained suspended in the lift gas. A portion of this lift gas may be by-passed through line 122a controlled by valve 122b to control the degree of elutriation. The thus separated granules drop from separators 110 directly into adsorbent hopper 11 to be recirculated with the main adsorbent stream. The elutriated lift gas passes upwardly from separator 110 into lift gas header 111 and subsequently passes into conduit 120 to the left of plate 112 which separates the outgoing lift gas from the adsorbent and lift gas descending through transfer line 37. The lift gas is removed from conduit 120 via connection 113 for treatment as above described.

The adsorbent passes downwardly through the lower part of transfer line 37 collects in that part of conical section 108 to the right of plate 112 submerging the inlets of tubes 116 as described in connection with Figure 1. The solids level is indicated and recorded by means of solids level recorder 106a. From the bottom of conical section 108 extends a series of adsorbent downcomer tubes 116 through each of which an equal quantity of adsorbent passes as a dense mass through and independently of centrifugal separator zone 10a for discharge directly into adsorbent storage zone 11. The lower extremities of tubes 116 may be slotted or otherwise perforated to permit the adsorbent to be delivered through a guided passage as the level 117 of adsorbent in storage zone 11 rises or falls. The tubes 116, being full of dense solid particles, prevent gas flow therethrough and force the lift gas containing suspended solids fines to flow through gas downcomers 109 into zone 10a, and then through separators 110 in the presence of the controlled upflow of purge gas only which rises as described through hopper zone 11 from the cooling zone shown in Figure 1. The solids fractionation thus obtained is practically perfect.

The foregoing description and drawings have been limited to a particular modification of impactless separator in which a series of elongated narrow slots in the upper end of the lift line tubes inside the separator is used. The width of these slots is preferably a minor fraction of the total lift line tube periphery so that the lift gas flows outwardly through the perforated end of lift line over an appreciable portion of its perforated length thereby gradually decreasing the lift gas velocity and pressure from the value in the lift line to a lower value at which the solids readily separate. This reduction removes the lifting forces on the particles and allows gravitational forces to dissipate momentum energy reducing their velocity to zero before they are able to impinge against exposed surfaces such as the upper portion of the impactless separator.

The perforated length of lift line comprising the extension zone inside the impactless separator may be provided with other types of apertures which also permit the gradual decrease in lift gas velocity and usually expose small amounts of surface area to particle impingement. Where long slots have been employed above, a series of relatively short slots having their major axis parallel or make any angle to that of the lift line tube may be employed. If desired the apertures may comprise a series of open holes such as those obtained by boring, drilling, or other operations performed upon the tube wall. In certain installations square holes such as those obtained by punching may be employed. Other sort of apertures besides those mentioned may be used such as openings prepared by sawing out sections of the tube wall to leave slots which are greater in peripheral distance than in longitudinal distance. The first type, however, is the preferred type since it has been found that the long longitudinal slots are easy to fabricate by acetylene burning or by milling or punching operations and that by varying the width of the slot over its length a gradual decrease in the lift gas velocity of any predetermined desired magnitude may be obtained.

Figure 3:
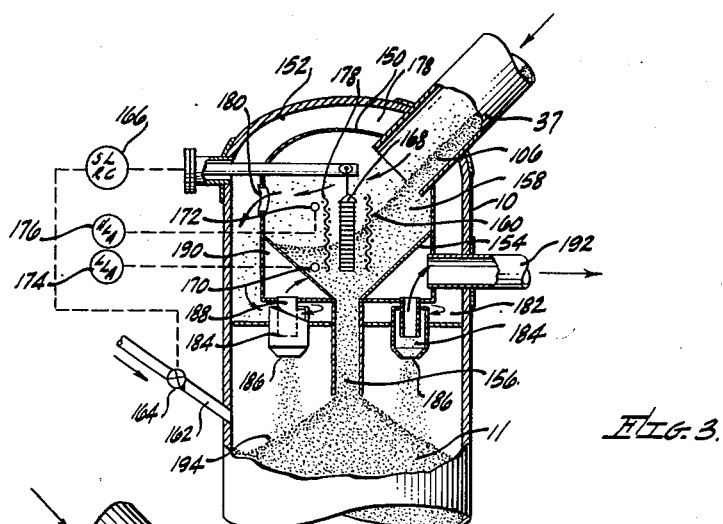
Figure 3 is an elevation view in cross section of a modified improved structure at the top of a small solids-fluid contacting column adapted to the high efficiency of elutriation of the solids.

Referring now more particularly to Figure 3, a detail elevation view in cross section is shown of a mechanical modification of the apparatus shown in and described in connection with Figures 1 and 2. Herein the upper portion of contacting column 10 is provided with an internal dummy shell or upper solids surge vessel 150 into which solids transfer line 37 discharges a downwardly moving bed of granular solids 106 through the wall of vessel 10. An annular chamber 152 is hereby formed between the upper surge vessel 150 and the walls of column 10. Disposed within the lower portion of upper surge vessel 150 is funnel member 154 from which depends solids downcomer 156. The granular solids 106 discharge downwardly by gravity into upper surge chamber 150 forming an accumulation of solids 158 which submerges the upper inlet opening of solids downcomer 156 and forms a continuous downwardly moving mass of dense-packed granular solids in funnel member 154, solids downcomer 156, and in hopper 11. The solids level 160 in upper surge chamber 150 will fluctuate slightly with changes in solids inventory in the system. As solids fines are gradually formed and removed by the improved elutriation system of this invention during long continued operation, solids level 160 will slowly fall, and additional granular solids are introduced into the recirculating system as described previously to maintain solids level 160 approximately in the position shown. These additional solids may be introduced through line 162 either intermittently or continuously at a rate controlled by valve 164 which in turn may be actuated if desired by solids level recorder controller 166.

The exact position of solids level 160 within upper surge chamber 150, which in turn indicates the solids inventory in the system, is detected by movable grid structure 168 which is preferably vertically disposed so as to be partially submerged at all times in solids mass 158. Grid 168 is preferably surrounded by stationary grid 169 to give a linear response at controller 166 with changes in solids level 160. The downwardly moving solids bed 158 surrounding grid 168 acts directly upon the grid tending to raise or lower it. Movements of grid 168 actuate solids level recorder controller 166 through a direct mechanical linkage and indicate and record the position of the solids level. The control of the addition of further solids to maintain the level between the low level and high level points indicated as 170 and 172 respectively may also be maintained in accordance with these grid movements. Low level alarm 174 and high level alarm 176 are provided to prevent emptying or over-filling upper solids surge chamber 150.

The separated solids and the lift gas containing suspended fine solids pass downwardly through transfer line 37 as substantially independent phases with the solids passing downwardly through downcomer 156 as previously described. The lift gas and suspended solids flow through the settling zone 178 above solids level 160 and pass therefrom through one or more ports 180 located in the wall of upper solids surge vessel 150. The gas then passes downwardly around chamber 150 through annular chamber 152 and enter the classifier inlet manifold zone 182 which is disposed around the upper portion of sealing leg 156 and below the funnel member 154. The lift gas then passes into one or more cyclone-type classifiers 184 within which the larger suspended solids of desirable mesh size are centrifugally separated and drop from the lower openings 186 into lower hopper 11. The lift gas containing undesirable suspended fines then passes upwardly from the cyclone classifiers through outlets 188 into classifiers outlet manifold 190 from which it is removed through outlet line 192. The lift gas is subsequently passed through cyclone separators to remove the total quantity of solids fines as indicated in Figure 1 at cyclone separator 80. The lift gas is then recirculated.

This modification of the structure of this invention is somewhat simpler mechanically than those shown in Figures 1 and 2, but embodies the same essentials and operates in entirely the same way as does the apparatus shown in those two figures. The presence of the downwardly moving bed of dense solids in upper surge chamber 150 and continuing through solids downcomer 156 into lower hopper 11 acts as a high resistance fluid flow path, prevents the downflow of any substantial quantities of lift gas containing suspended fines with the solids into the gas space above the solids in hopper 11, and prevents the by-pass of such gas upwardly through the cyclone classifiers 184 through their lower openings 186. Thus substantially all of the lift gas containing suspended fines is caused to flow in the proper path through the centrifugal classifiers 184. It has been found that this system permits a substantially complete separation of adsorbent particles finer than 35 mesh from a recirculating adsorbent stream containing charcoal particles having a mesh range of from 12 to 30 mesh and that no suspended adsorbent particles having a mesh size smaller than 30 are carried out with the elutriation gas through line 192.

It should be noted that the addition of more solids through line 162 at the point shown in Figure 3 or through line 60 in Figure 1 effects a substantially immediate increase in level 160 because as solids level 194 rises in lower hopper 11, solids will flow automatically at a temporarily decreased rate from the outlet opening of downcomer 156 and this in turn causes an immediate rise in solids level 160 because solids mass 106 flows at a substantially constant rate. This effect of increasing solids level 160 is due to the effective variation in the rate of removal of solids through distributor tube 156, and in a simple conveyance process such a solids flow rate control by means of a valve or other solids flow controller has the identical result of keeping the solids level up in the solids surge zone 150.

Figure 4:
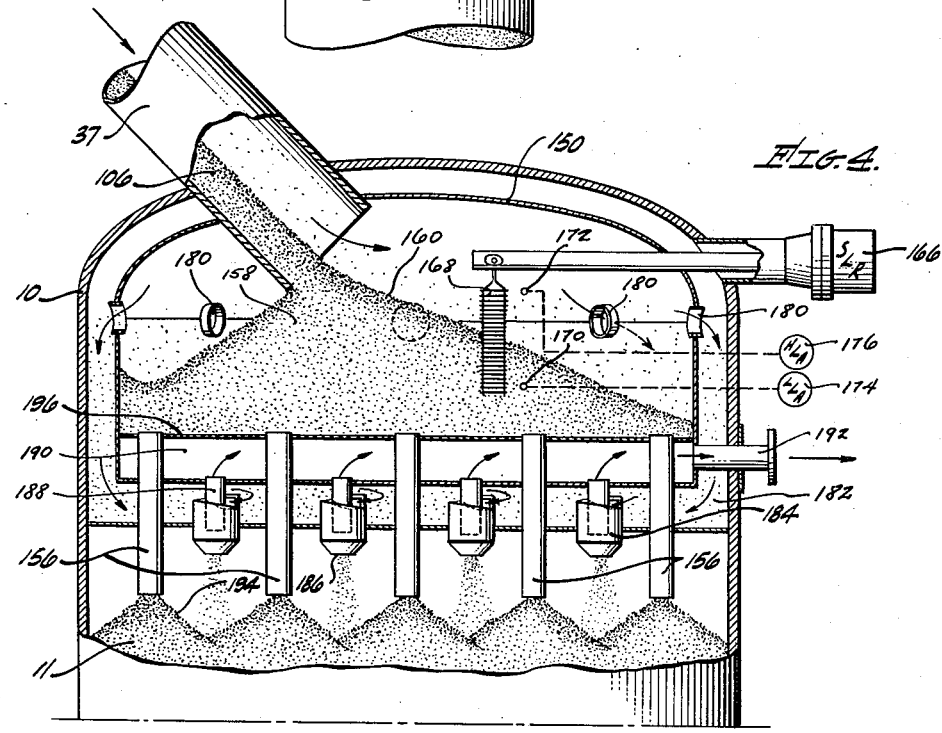
Figure 4 is an elevation view in cross section typical of the large commercial scale application of the solids fractionation system of this invention.

In Figure 4 is shown an elevation view in cross section of the upper portion of a contacting column employing the solids handling system of this invention modified so as to be adaptable to contacting columns of large cross section such as those employed in commercial scale adsorptive gas fractionation, the catalytic hydrocarbon conversion processes mentioned previously, and the like. In this drawing, mechanical elements which are analogous to those shown and described in Figure 3 are designated here by the same numbers. The only substantial change involves the use of a flat bottom 196 in upper solids surge chamber 150 instead of the funnel member 154 shown in Figure 3, the use of a plurality of solids distributors 156, and a larger plurality of centrifugal solids classifiers 184. The operation is otherwise identical.

When either of the apparatuses of Figures 3 and 4 is applied to the selective adsorption process described above, a purge gas consisting of a portion of the unadsorbed lean gas passing upwardly through the cooling zone described is disengaged from the solids in lower hopper 11 through solids level 194 and continues upwardly through the lower outlet openings 186 of the cyclone classifiers. In the present invention, this is the only gas flow upwardly through lower openings 186, the lift gas being prevented from by-passing through such openings by the means described. The effect of such purge gas flow is highly significant in that it further elutriates the centrifugally separated solids of desirable mesh size range and removes therefrom any residual solids fines which may find their way into this recovered solids fraction.

Although the foregoing modifications have been described in connection with their application in the fractionation of gases by selective adsorption on a bed of solid granular adsorbent, it is obvious that the handling of solids in the many well-known solids-fluid contacting processes presently used can also be benefitted. In catalytic cracking, reforming, desulfurization, dehydrogenation, and isomerization of hydrocarbons, as well as the contacting of fluids with any moving solids stream in the form of a dense bed, solids fines formed in the process are detrimental to such solids-fluid contact and must be removed. The process of the present invention is obviously applicable to such processes since it is independent of the nature of the process and the physical and chemical characteristics of the solids being employed.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A solids-fluid contacting process which comprises passing a granular solid material downwardly by gravity from a solids hopper zone through a contacting column containing at least one contacting zone, passing a fluid therethrough to contact said solids, removing solid contact material from the bottom of said column, conveying said solid material by means of a conveyance fluid upwardly through an elongated conveyance zone into a solids-fluid separator zone wherein said conveyance fluid and solids are separated into substantially independent phases consisting of a conveyance fluid containing suspended fine solids and a dense moving mass of conveyed solids, passing said solids downwardly as a mass into an upper solids surge zone to form therein a dense moving accumulation of solids of variable solids level and then from said accumulation as a dense moving bed through at least one distribution zone through and independently of a centrifugal classification zone and back into said contacting zone, passing said conveyance fluid containing fines into said classification zone wherein larger suspended solids of desirable size are separated and combined with said dense moving solids flowing into said solids hopper zone leaving the gas containing suspended solids fines of sizes undesirable in said contacting zone, removing said gas and fines from said classification zone, continuously detecting the position of the level of solids in said upper solids surge zone, and adding solids in response to the position of the detected solids level into the recirculating solids stream to keep the dense solids level in said surge zone thereby maintaining sufficient solid contact material inventory in the circulating system to maintain a continuous downwardly moving dense mass of solid granular contact material extending from said solids level in said upper solids surge zone down through said distribution zone into said solids hoper zone whereby any substantial simultaneous flow of conveyance fluid and solids fines therethrough is prevented.

2. In a solids-fluid contacting process wherein a stream of granular solid contact material is passed downwardly from a hopper zone through a contacting column and then is conveyed by means of a conveyance fluid from the bottom of said column to an elevated separator zone from which the solids are recirculated to said column for repassage therethrough, the improvement in removing solids of smaller than desirable size from the recirculating solids stream which comprises passing said solids from said separator zone as a dense downwardly moving mass into an upper solids surge zone to form therein a dense solids accumulation of variable level, passing solids from said accumulation as a dense downwardly moving mass indirectly through a centrifugal classification zone and directly through at least one distribution zone into said hopper zone, passing the conveyance fluid and suspended solids fines from said separator zone into said classification zone, removing therefrom a conveyance fluid containing suspended undesirable sized solids fines while passing desirable sized solids directly therefrom into said hopper zone for combination with the moving mass of solids discharging thereinto from said distribution zone, continuously detecting the position of the level of the solids accumulation in said upper solids surge zone, and adding more solids to the circulating solids stream in response to the detected position to maintain the dense moving mass of solids in said solids surge and distribution zones thereby preventing any substantial flow of conveyance fluid and solids fines through said distribution zone into said hopper zone and forcing substantially all of said fluid and suspended solids fines to flow directly into said classification zone.

3. In a solids-fluid contacting process wherein a granular solid contact material is recirculated through a hopper zone and a contacting zone and then with a conveyance fluid through an elongated conveyance zone for return to said hopper zone, the improved method for solids recirculation and elutriation of undesirable fine solids from the recirculating solids stream which comprises the steps of discharging the conveyance fluid and solids into an elevated separator zone, flowing the conveyance fluid containing suspended solids and a dense mass of conveyed solids as substantially independent phases from said separator zone into an upper solids surge zone forming therein a dense moving accumulation of conveyed solids having a variable level, passing said fluid and suspended solids therefrom into a centrifugal classification zone which communicates with said hopper zone, controlling the classification to produce from said classification zone a fluid containing substantially only solid fines undesirable in the recirculating solids stream and a fraction of larger solids desirable in said stream and substantially free of said solid fines, passing the fraction of larger solids directly into said hopper zone, flowing solids from said accumulation of conveyed solids as a dense mass through and independently of said classification zone directly into said hopper zone via at least one elongated distribution zone whereby said solids are combined with said fraction of larger solids, continuously detecting the upper level of said accumulation in said solids surge zone, and adding to the recirculating solids stream further solids to maintain said level to keep the lower part of said surge zone and said distribution zone full with a dense moving solids mass to prevent any substantial amount of said fluid and suspended fines from flowing concurrently with said dense solids into said hopper zone.

4. A process according to claim 3 wherein said upper solids surge zone, said classification zone, and said distribution zone are all enclosed within the upper portion of a solids-fluid contacting column containing said contacting zone.

5. A process according to claim 3 in combination with the step of passing said recirculated stream of solids downwardly as a dense moving bed by gravity within said contacting column from said hopper zone and through said contacting zone whereby the upper level of the solids bed in said hopper zone intersects with the lower discharge opening of said distribution zone.

6. A process according to claim 3 in combination with a plurality of parallel elongated distribution zones and the step of passing a plurality of separate parallel streams of dense downwardly moving solids therethrough from a plurality of uniformly distributed points in the lower cross section of said solids surge zone to a plurality of uniformly distributed points in the upper cross section of said hopper zone.

7. A process for the conveyance of granular solids and removal of solids fines therefrom which comprises conveying said solid material by means of a conveyance fluid upwardly through an elongated conveyance zone into a solids-fluid separator zone wherein said conveyance fluid and solids are separated into substantially independent phases consisting of a conveyance fluid containing suspended fine solids and a dense moving mass of conveyed solids, passing said solids downwardly as a mass into an upper solids surge zone to form therein a dense moving accumulation of solids of variable solids level and then from said accumulation as a dense moving bed through at least one distribution zone through and independently of a centrifugal classification zone to a solids delivery point, passing said conveyance fluid containing fines into said classification zone wherein larger suspended solids of desirable size are separated and combined with said dense moving solids flowing to said solids delivery point from said distribution zone leaving the gas containing suspended solids fines of undesirable sizes, removing said gas and fines from said classification zone, and maintaining a continuous downwardly moving dense mass of solid material extending from a solids level continuously detected and maintained in said upper solids surge zone down through said distribution zone to said delivery point whereby any substantial simultaneous flow of conveyance fluid and fines therethrough is prevented and the flow is thereby forced into said classification zone.

8. A process according to claim 7 in combination with the step of continuously detecting the level of the dense solids accumulation in said solids surge zone, and controlling the rate of solids removal therefrom through said distribution zone to maintain said solids level.

9. A method for the conveyance of and fines elutriation from granular solid material which comprises discharging conveyed solids and a conveyance fluid into an elevated separator zone, passing said solids from said separator zone as a dense downwardly moving mass into an upper solids surge zone to form therein a dense solids accumulation of variable level, passing solids from said accumulation as a dense downwardly moving mass indirectly through a centrifugal classification zone and directly through at least one distribution zone to a solids delivery point, passing the conveyance fluid and suspended solids fines from said separator zone into said classification zone, removing therefrom a conveyance fluid containing undesirable sized solids fines while passing desirable sized solids directly to said delivery point for combination with said moving mass of solids discharging thereinto from said distribution zone, continuously detecting the position of the level of the solids accumulation in said upper solids surge zone, and controlling the solids flow continuously to maintain the dense mass of solids in said solids surge and distribution zones thereby preventing any substantial flow of conveyance fluid and solids fines through said distribution zone to said delivery point and forcing substantially all of said fluid and fines to flow directly into said classification zone.

10. An improved process for conveying granular solids and separating undesirable solids fines therefrom which comprises the steps of discharging the conveyance fluid and solids into an elevated separator zone, flowing the conveyance fluid containing suspended solids and a dense mass of conveyed solids as substantially independent phases from said separator zone into an upper solids surge zone forming therein a dense moving accumulation of conveyed solids having a variable level, passing said fluid and suspended solids therefrom into a centrifugal classification zone which communicates through its solids outlet with a solids delivery point, controlling the classification to produce from said classification zone a fluid containing substantially only solid fines undesirable in the conveyed solids and a fraction of larger solids of desirable size which is substantially free of said solids fines, passing the fraction of larger solids directly to said delivery point, flowing solids from said accumulation of conveyed solids as a continuous dense moving mass through and independently of said classification zone directly into said delivery point via at least one elongated distribution zone whereby said solids are combined with said fraction of larger solids, continuously detecting the upper level of said accumulation in said solids surge zone, and controlling the solids flow so as to maintain said level to keep the lower part of said surge zone and said distribution zone full with a dense moving solids mass to prevent any substantial amount of said fluid and suspended fines from flowing concurrently with said dense solids to said delivery point.

11. An apparatus which comprises, in combination with a solids conveyance means comprising a multiplicity of parallel conveyance conduits adapted to the conveyance of granular solids in suspension in a conveyance fluid, an elongated impactless separator chamber in solids-receiving relation to said conveyance means, a multiplicity of parallel extension conduits each coaxial with a conduit in said conveyance means, said extension conduits opening into and extending substantially entirely through said impactless separator chamber and forming a settling chamber therein surrounding said extension conduits, each of said extension conduits being provided with a plurality of relatively narrow parallel elongated longitudinal slots having a total slot width around the periphery thereof of between about 4% and about 50% of said periphery and adapted to the lateral flow of conveyance fluid and suspended solids from said extension conduits into said settling chamber while depositing separated solids therein by gravity substantially without attrition loss, transfer line means for removing separated granular solids and conveyance fluid as substantially independent phases opening from the bottom of said settling chamber, an upper solids surge chamber in solids and fluid receiving relation to said transfer line, an upper horizontal tray disposed below said surge chamber and forming therewith an outlet manifold space, a lower horizontal tray below said upper tray and forming therebetween an inlet manifold space which communicates with the upper part of said solids surge chamber, at least one centrifugal classifier disposed substantially between said trays and having its fluid outlet opening into said outlet manifold space and its fluid inlet opening into said inlet manifold space and its solids outlet opening below said lower horizontal tray, at least one distributing conduit communicating at its inlet with the bottom of said solids surge chamber and extending downwardly through and independently of said outlet and inlet manifold spaces and terminating at a point below said lower horizontal tray, and a solids level indicator controller adapted to be actuated continuously by the position of the level of a dense solids accumulation in said solids surge chamber adapted to maintain a dense downwardly moving mass of solids within said distributor conduit to prevent any substantial flow of conveyance fluid therethrough from said surge chamber.

12. An apparatus which comprises an impactless separator chamber in solids receiving relation to a conveyance conduit conveying a suspension of solids in a fluid, an extension of said conduit opening coaxially into and extending substantially through said impactless separator chamber, said extension being provided with a plurality of relatively narrow elongated openings arranged parallel to one another around the periphery of said extension and having a total width of between about 4% and about 50% of the extension periphery and adapted to the lateral flow of fluid and solids therethrough thereby gradually decreasing fluid velocity in said extension while depositing separated solids by gravity in said impactless separator chamber, a transfer line for removing separated solids and conveyance fluid as substantially independent phases from the lower end of said impactless separator chamber, an upper solids surge chamber in solids and fluid receiving relation to said transfer line, an upper horizontal tray disposed below said surge chamber and forming therewith an outlet manifold space, a lower horizontal tray below said upper tray and forming therebetween an inlet manifold space which communicates with the upper part of said solids surge chamber, at least one centrifugal classifier disposed substantially between said trays, and having its fluid outlet opening into said outlet manifold space and its fluid inlet opening into said inlet manifold space and its solids outlet opening below said lower horizontal tray, at least one distributing conduit communicating at its inlet with the bottom of said solids surge chamber and extending downwardly through and independently of said outlet and inlet manifold spaces and terminating at a point below said lower horizontal tray, and a solids level indicator controller adapted to be actuated continuously by the position of the level of a dense solids accumulation in said solids surge chamber adapted to maintain a dense moving mass of solids within said distributor conduit to prevent any substantial flow of conveyance fluid therethrough from said surge chamber.

13. An apparatus which comprises a solids-fluid separator chamber in solids receiving relation to a conveyance conduit carrying granular solids and a conveyance fluid, an upper solids surge chamber, a transfer conduit opening thereinto from the bottom of said separator chamber, at least one solids distributing conduit opening downwardly to a solids delivery point from said surge chamber, a plurality of centrifugal classifiers disposed below said surge chamber and above said delivery point, an outlet manifold communicating with the classifier fluid outlets, an inlet manifold communicating the classifier fluid inlets with the fluid space in the upper part of said surge chamber, and a granular solids level indicator disposed within said surge chamber adapted to detect fluctuations continuously in the level of a mass of dense solid material moving downwardly successively through said transfer conduit and said distribution conduit to said delivery point.

14. An apparatus according to claim 13 in combination with means responsive to said solids level indicator for controlling the rate of solids flow from said distribution conduit to maintain said solids level in said upper solids surge chamber.

15. An apparatus according to claim 14 wherein said solids level indicator includes an elongated grid structure disposed within said solids surge chamber and extending substantially vertically therein so as to be partially submerged by the solids bed whose level is to be detected.

16. An apparatus according to claim 13 in combination with a closed vessel containing said delivery point, said solids surge chamber being disposed within the upper part of said vessel, an upper transverse tray disposed immediately below the lower surface of said surge chamber forming therebetween said outlet manifold, an outlet conduit opening from said manifold through the wall of said vessel, a lower transverse tray sealed at its periphery against the inner wall of said vessel below said upper transverse tray forming therebetween said inlet manifold, each of said classifiers being supported by said transverse trays and having a lower solids outlet opening through said lower transverse tray, an upper fluid outlet opening through said upper tray, and an inlet opening between said trays in the inlet manifold.

17. An apparatus according to claim 15 wherein said means for controlling solids flow from said distributing conduit comprises a solids inlet conduit opening into said vessel adjacent the outlet of said distributing conduit, and a valve in said inlet conduit.

18. An apparatus according to claim 13 wherein said inlet manifold conduit communicates through a plurality of vertical open ended conduits extending from the upper part of said solids surge chamber to a point below said upper transverse tray.

19. An apparatus according to claim 13 wherein said inlet manifold communicates through an annular space between the top and walls of said vessel and the top and walls of said solids surge chamber and through at least one port in the upper part of surge chamber wall with the fluid space in the upper part thereof.

References Cited in the file of this patent
UNITED STATES PATENTS

| | | |
|---|---|---|
| 2,590,148 | Berg | Mar. 25, 1952 |
| 2,694,605 | Berg | Nov. 16, 1954 |
| 2,716,050 | Hagerbaumer | Aug. 23, 1955 |